US012631471B1

(12) United States Patent
Miftakhutdinov

(10) Patent No.: US 12,631,471 B1
(45) Date of Patent: May 19, 2026

(54) REPLACEMENT SCHEME FOR MAP CHECKPOINTS

(71) Applicant: Apple Inc., Cupertino, CA (US)

(72) Inventor: Rustam Miftakhutdinov, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 402 days.

(21) Appl. No.: 18/329,297

(22) Filed: Jun. 5, 2023

(51) Int. Cl.
*G06F 40/177* (2020.01)
*G01C 21/00* (2006.01)

(52) U.S. Cl.
CPC ....... *G01C 21/387* (2020.08); *G01C 21/3804* (2020.08); *Y10S 707/99951* (2013.01); *Y10S 707/99953* (2013.01)

(58) Field of Classification Search
CPC . G06F 40/177; G01C 21/383; G01C 21/3851; G01C 21/3867; G01C 21/3887; G01C 21/3888; G01C 21/387; G01C 21/3801; Y10S 707/99953; Y10S 707/99951
USPC ........................................ 701/450
See application file for complete search history.

(56) References Cited

U.S. PATENT DOCUMENTS 6,948,052 B2 9/2005 Nguyen et al.
7,246,141 B2 * 7/2007 Wolczko ............. G06F 12/0886
7,415,597 B2 8/2008 Filippo et al.
7,660,971 B2 2/2010 Agarwal et al.
8,099,586 B2 1/2012 Chou et al.
8,276,127 B2 * 9/2012 Rydh .................... G06F 11/366
717/130

(Continued)

FOREIGN PATENT DOCUMENTS

CA         3060350 A1 * 10/2018 ............... G06F 9/52
EP         2044755 B1 * 7/2015 ........... G06F 40/194
WO    WO-2014007722 A2 * 1/2014 ........... G06F 16/168

OTHER PUBLICATIONS

Bou, Savong, Hiroyuki Kitagawa, and Toshiyuki Amagasa. "Cpix: Real-time analytics over out-of-order data streams by incremental sliding-window aggregation." IEEE Transactions on Knowledge and Data Engineering 34.11 (2021): 5239-5250. (Year: 2021).*
Baird, Max M. A checkpointing mechanism for GPU intensive HPC applications. Diss. Heriot-Watt University (Year: 2021).*
Bou, Savong, Hiroyuki Kitagawa, and Toshiyuki Amagasa. "Cbix: Incremental sliding-window aggregation for real-time analytics over out-of-order data streams." DEIM Forum, F7-5. (Year: 2018).*
Zhao, Peng. libELC-A portable library enabling fault tolerance of MPI programs in heterogeneous environments. Diss. University College Dublin (Year: 2005).*

(Continued)

*Primary Examiner* — Cuong H Nguyen
(74) *Attorney, Agent, or Firm* — Kowert, Hood, Munyon, Rankin & Goetzel, P.C.; Mark. D. Seegers; Dean M. Munyon

(57) ABSTRACT

Techniques are disclosed pertaining to a replacement scheme for map checkpoints. A processor of a computer system receives an instruction to be executed. The processor updates the state of a map structure to map a set of logical registers specified by the instruction to a set of physical registers. The processor then stores a first map checkpoint that corresponds to the updated state of the map structure and is usable by the processor to restore the map structure to the updated state. The storing of the first map checkpoint can include the processor selecting a second map checkpoint from a set of stored map checkpoints based on a non-first in, first out replacement scheme. The second map checkpoint may thus be selected out of order relative to an order in which the set of stored map checkpoints were stored. The second map checkpoint is overridden with the first map checkpoint.

20 Claims, 11 Drawing Sheets

(56) References Cited

U.S. PATENT DOCUMENTS

| | | | | |
|---|---|---|---|---|
| 8,855,909 B2 * | 10/2014 | Bauer | .............. | G08G 1/096816 |
| | | | | 701/450 |
| 9,575,763 B2 | 2/2017 | Fleischman et al. | | |
| 10,013,255 B2 * | 7/2018 | Friedmann | .......... | G06F 9/30058 |
| 11,321,089 B2 | 5/2022 | Gupta et al. | | |
| 11,727,257 B2 * | 8/2023 | Lie | ........................ | G06F 9/3016 |
| | | | | 706/15 |
| 11,995,030 B1 * | 5/2024 | Braidwood | ......... | G06F 9/30196 |
| 2005/0270306 A1 * | 12/2005 | Nomura | ............... | G09B 29/003 |
| | | | | 345/619 |
| 2016/0057052 A1 * | 2/2016 | Zhang | ................. | H04L 41/0863 |
| | | | | 709/239 |
| 2020/0272474 A1 | 8/2020 | Gabor et al. | | |
| 2022/0091782 A1 | 3/2022 | Guim Bernat et al. | | |
| 2022/0398443 A1 * | 12/2022 | Lie | ........................ | G06F 9/5077 |

OTHER PUBLICATIONS

Liu, Wenxuan, et al. "RapidScribe: Bandwidth-aware Parallel Check-point for Distributed Neural-Network Training." 2025 IEEE 45th International Conference on Distributed Computing Systems (ICDCS). IEEE, 2025. (Year: 2025).*

White, Sam. Runtime techniques for efficient execution of virtualized, migratable MPI ranks. Diss. University of Illinois at Urbana-Champaign, 2022. (Year: 2022).*

Yu, Liangcheng, et al. "Beaver: Practical partial snapshots for distributed cloud services." 18th USENIX Symposium on Operating Systems Design and Implementation (OSDI 24). 2024. (Year: 2024).*

* cited by examiner

600

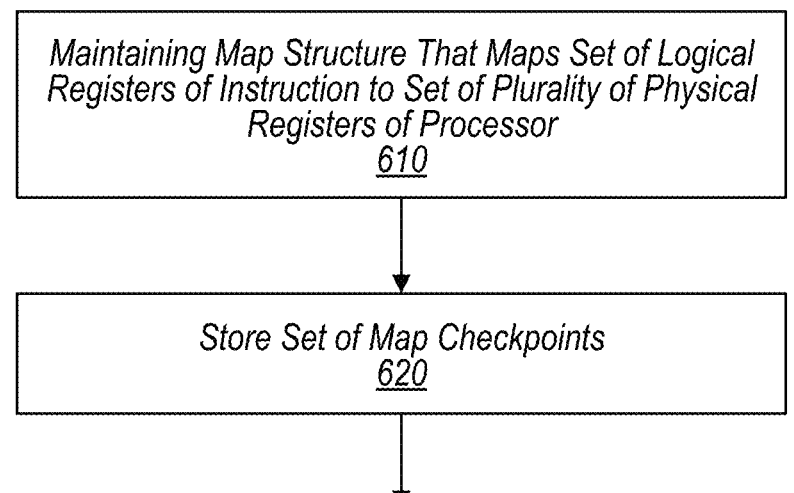

Maintaining Map Structure That Maps Set of Logical
Registers of Instruction to Set of Plurality of Physical
Registers of Processor
610

Store Set of Map Checkpoints
620

Based at Least in Part on Detection That Set of Map
Checkpoints Includes Threshold Number of Map
Checkpoints, Replace First One of Set of Map
Checkpoints With Second Map Checkpoint in
Accordance With Non-First In, First Out (Non-FIFO)
Replacement Scheme That Alters Relative Spacing of
Set of Map Checkpoints Within Dynamically Changing
Out-Of-Order Execution Window
630

FIG. 6

700

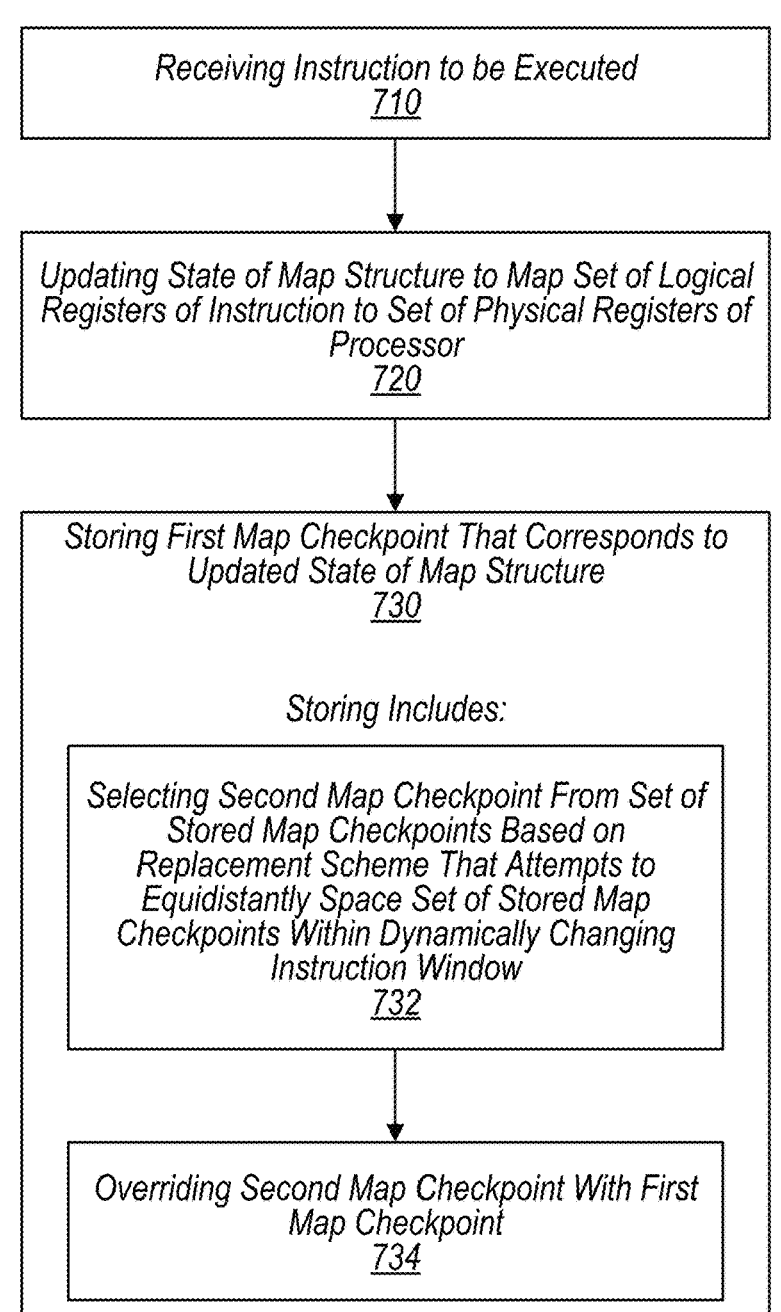

Receiving Instruction to be Executed
710

Updating State of Map Structure to Map Set of Logical
Registers of Instruction to Set of Physical Registers of
Processor
720

Storing First Map Checkpoint That Corresponds to
Updated State of Map Structure
730

Storing Includes:

Selecting Second Map Checkpoint From Set of
Stored Map Checkpoints Based on
Replacement Scheme That Attempts to
Equidistantly Space Set of Stored Map
Checkpoints Within Dynamically Changing
Instruction Window
732

Overriding Second Map Checkpoint With First
Map Checkpoint
734

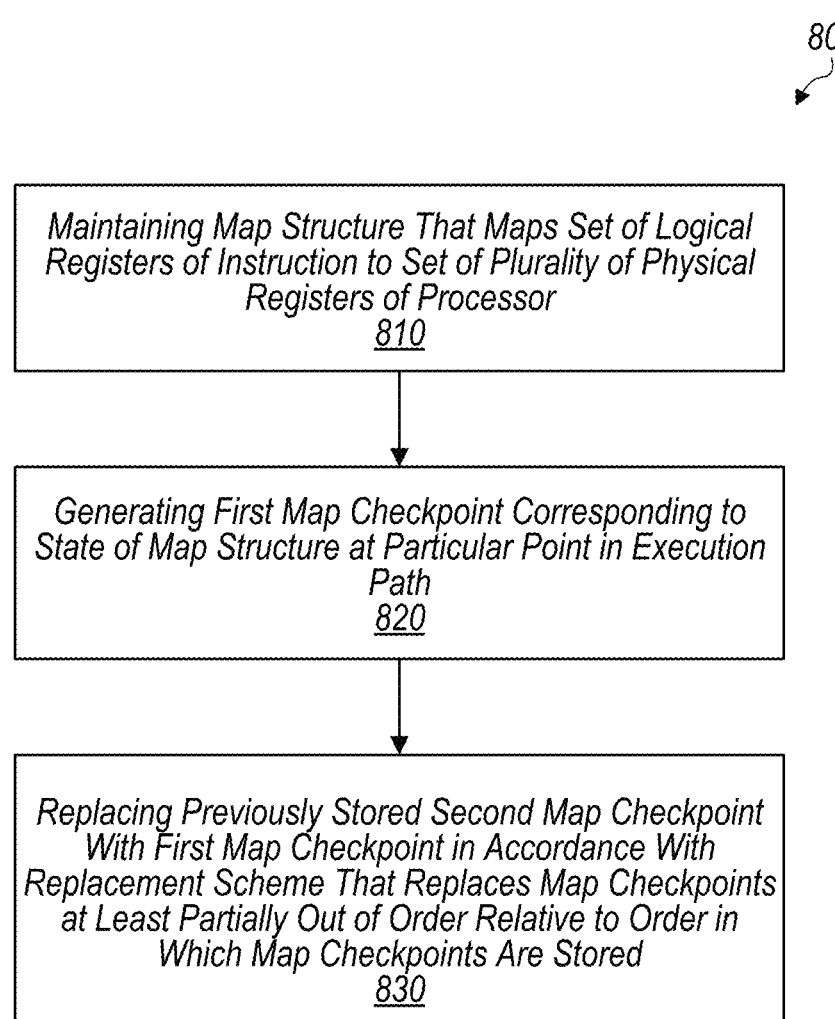

Maintaining Map Structure That Maps Set of Logical Registers of Instruction to Set of Plurality of Physical Registers of Processor
810

Generating First Map Checkpoint Corresponding to State of Map Structure at Particular Point in Execution Path
820

Replacing Previously Stored Second Map Checkpoint With First Map Checkpoint in Accordance With Replacement Scheme That Replaces Map Checkpoints at Least Partially Out of Order Relative to Order in Which Map Checkpoints Are Stored
830

*FIG. 8*

REPLACEMENT SCHEME FOR MAP CHECKPOINTS

BACKGROUND

Technical Field

This disclosure relates generally to a computer processor and, more specifically, to a checkpoint replacement scheme for replacing map/rename checkpoints.

Description of the Related Art

Modern computer systems often include a system on a chip (SOC) that integrates many components (e.g., a central processing unit (CPU), memory, input/output (I/O) ports, etc.) onto a chip. During operation, a processor accesses instructions from memory and executes them to implement various software routines, such as an operating system. A processor may implement different mechanisms to improve instruction-level parallelism and increase performance. One such mechanism is register renaming in which a processor maps logical registers identified by an instruction to physical registers of that processor. Register renaming eliminates certain data dependencies hazards (e.g., write-after-write hazards) that can arise from the reuse of physical registers by successive instructions that do not have real data dependencies between them. By eliminating those dependencies hazards, greater instruction-level parallelism can be achieved, which can be exploited by other complementary techniques (e.g., superscalar and out-of-order execution) for better performance.

BRIEF DESCRIPTION OF THE DRAWINGS

FIGS. 6-8 are flow diagrams that illustrate example methods that relate to replacing map checkpoints in accordance with a non-first in, first out replacement scheme, according to some embodiments.

DETAILED DESCRIPTION

Figure 1:
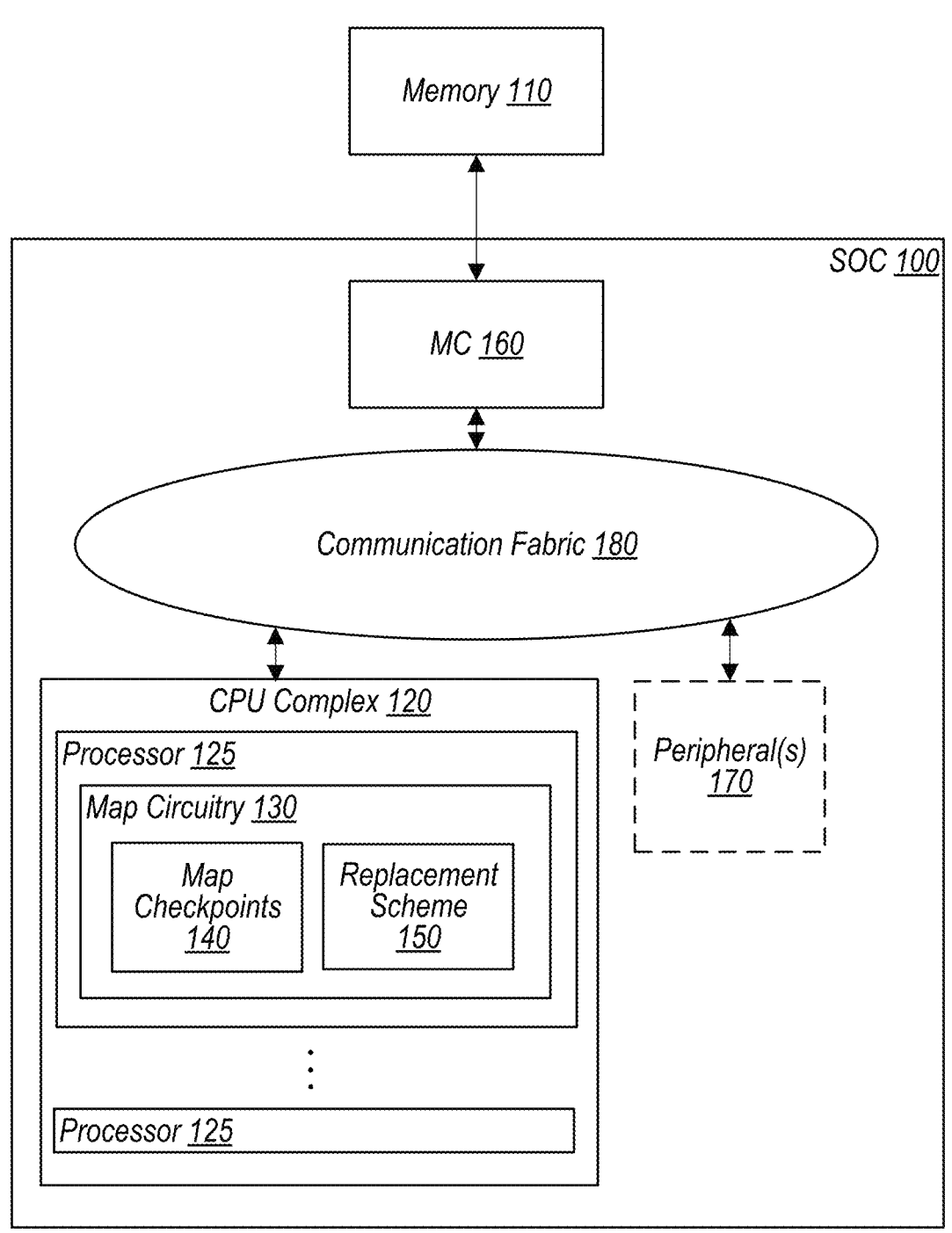
FIG. 1 is a block diagram illustrating example elements of a system on a chip (SOC) that is coupled to a memory, according to some embodiments.

To implement the register renaming technique, a processor typically includes a rename map table that holds the mappings between the logical registers specified by instructions to the physical registers of the processor. The rename map table changes over time as stored mappings are overwritten with new mappings for new incoming instructions that use the same logical registers for their destination. A processor usually implements speculative mechanisms, such as branch prediction, that attempt to predict what instructions or data are likely to be needed in the near future and the processor begins executing the instructions based on the prediction. But that prediction may be incorrect. When a misprediction occurs, a redirect occurs in which the state of the processor is rolled back to a particular point in the execution that occurs before the speculative path and thus instructions that were executed using the incorrect prediction and their results are discarded. As part of the redirect, the rename map table is rolled back such that the mappings that were stored at the particular point in the execution are restored. Rolling back the rename map table change-by-change, however, can take a considerable amount of time and thus the processor may periodically take snapshots of the rename map table that are stored as map checkpoints. A map checkpoint is usable by the processor to restore the rename map table to a state that corresponds to that map checkpoint. Accordingly, when rolling back the rename map table to a particular state, the processor may restore the rename map table utilizing a map checkpoint that corresponds to a nearby state (or the particular state, in some cases) and then roll back or forward the rename map table to the particular state.

A processor, however, can store only a limited number of map checkpoints (e.g., due to die space constraints). Accordingly, using conventional approaches, the processor replaces map checkpoints based on a first in, first out (FIFO) replacement policy—i.e., the processor replaces the oldest stored map checkpoint when storing a new map checkpoint. But the FIFO replacement policy can result in a distribution of the map checkpoints across an out-of-order execution window that is undesirable and reduces the speed at which the processor can roll back to a particular restore point. In particular, the out-of-order execution window can expand and contract based on the number of instructions that are in flight. Since the FIFO replacement policy replaces the oldest map checkpoint with a new map checkpoint, then as the out-of-order execution window expands to encompass younger incoming instructions, the map checkpoints can become densely packed on the younger-instruction side of the execution window. Consider an example in which a processor is able to store four map checkpoints and those map checkpoints are generated every 32 instructions. If an execution window expands to encompass 320 instructions, then the stored map checkpoints will fall within the first half of the execution window while the second half of the execution window will not be associated with any stored map checkpoints. Consequently, if the processor has to roll back to a restore point in the second half, then the processor may have to execute a large number of operations in order to roll back the rename map table to that restore point. Alternatively, if a processor allocates checkpoints more sparingly so that they are spaced out more to cover the maximum size of the out-of-order window, then the processor ends up not using all of the available checkpoint storage and taking longer time to recover the rename map table in cases where a redirect occurs and the out-of-order window is not close to being fully occupied. This disclosure addresses, among other things, the problem of how to roll back a rename map table in a manner that overcomes some or all of the deficiencies discussed above.

In various embodiments that are discussed below, a processor comprises map circuitry that is configured to replace map checkpoints in accordance with a non-first in, first out (non-FIFO) replacement scheme that alters the relative spacing of the stored map checkpoints within an execution window. The map circuitry, in various embodiments, is coupled to fetch circuitry that fetches instructions for execution by the processor and provides information pertaining to the fetched instructions to the map circuitry. The map circuitry maintains a map structure (e.g., a rename map table) that is used to store mappings between logical registers that are specified by instructions to physical registers of the processor. In various embodiments, the map circuitry stores a map checkpoint in response to the occurrence of certain events (e.g., after executing a particular number of map operations) that is usable to roll back the map structure to a particular state.

If a threshold number of map checkpoints (e.g., six) are stored, then the map circuitry replaces one of the stored map checkpoints with the new map checkpoint based on a non-FIFO replacement scheme. In various embodiments, the map circuitry assigns tier numbers (e.g., 0, 1, 2, and 3) to map checkpoints according to a repeating sequence. When replacing one of the stored map checkpoints, the map circuitry may select a map checkpoint based on validity state, assigned tier value, and age. As an example, the map circuitry may select the youngest lowest-tier-numbered map checkpoint. The map circuitry then replaces that selected map checkpoint with the new map checkpoint. In various embodiments, the repeating sequence is defined such that, as the execution window expands, the instruction distance between map checkpoints also expands in the execution window. Similarly, as the execution window contracts, the instruction distance between map checkpoints contracts in the execution window.

These techniques may be advantageous over prior approaches as they facilitate a more equidistant distribution of map checkpoints in a dynamically changing execution window. As a result, a processor may roll back a rename map table more efficiently (e.g., in less execution cycles) than a processor that uses a FIFO replacement scheme to replace map checkpoints. For example, the non-FIFO replacement scheme discussed in this disclosure can cause stored map checkpoints to fall within both halves of an execution window that has expanded to encompass a large number of instructions. As a result, a processor may be able to select a map checkpoint that is relatively closer to the restore point when the processor has to roll back the rename map table to that restore point.

Turning now to FIG. 1, a block diagram of an example system on a chip (SOC) 100 that is coupled to a memory 110 is depicted. As implied by the name, the components of SOC 100 can be integrated onto a single semiconductor substrate as an integrated circuit "chip." In some cases, however, the components are implemented on two or more discrete chips in a computing system. In the illustrated embodiment, the components of SOC 100 include a central processing unit (CPU) complex 120, a memory controller (MC) 160, one or more peripheral components 170 (more briefly, "peripherals"), and a communication fabric 180. Components 120, 160, and 170 are all coupled to communication fabric 180 as depicted, and memory controller 160 may be coupled to memory 110 during use. Also as shown, CPU complex 120 includes at least two processors 125. As further shown, a processor 125 includes map circuitry 130 that stores map checkpoints 140 and implements a replacement scheme 150. In some embodiments, SOC 100 is implemented differently than shown. For example, SOC 100 can include a display controller, power management circuitry, etc. It is noted that the number of components of SOC 100 (and the number of subcomponents for those shown in FIG. 1, such as within the CPU complex 120) may vary between embodiments. Accordingly, there may be more or fewer of each component or subcomponent than the number shown in FIG. 1.

Memory 110, in various embodiments, is usable to store data and program instructions that are executable by CPU complex 120 to cause a system having SOC 100 and memory 110 to implement operations described herein. Memory 110 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), etc. Memory available to SOC 100 is not limited to primary storage such as memory 110. Rather, SOC 100 may further include other forms of storage such as cache memory (e.g., L1 cache, L2 cache, etc.) in CPU complex 120.

CPU complex 120, in various embodiments, includes a set of processors 125 that serve as a CPU of the SOC 100. Processors 125 may execute the main control software of the system, such as an operating system. Generally, software executed by the CPU during use controls the other components of the system to realize the desired functionality of the system. Processors 125 may further execute other software, such as application programs. An application program may provide user functionality and rely on the operating system for lower-level device control, scheduling, memory management, etc. Consequently, processors 125 may also be referred to as application processors. CPU complex 120 may include other hardware such as an L2 cache and/or an interface to the other components of the system (e.g., an interface to communication fabric 180).

A processor 125, in various embodiments, includes any circuitry and/or microcode that is configured to execute instructions defined in an instruction set architecture implemented by the processor 125. Processors 125 may encompass discrete microprocessors, processors and/or microprocessors integrated into multichip module implementations, processors implemented as multiple integrated circuits, etc. Processors 125 can fetch instructions and data from memory 110 as a part of executing load instructions and store the fetched instructions and data in caches of CPU complex 120. In various embodiments, processors 125 share a common last level cache (e.g., an L2 cache) while including their own caches (e.g., an L0 cache, an L1 cache, etc.) for storing instructions and data. Processors 125 can retrieve instructions and data (e.g., from the caches) and execute those instructions (e.g., conditional branch instructions, ALU instructions, etc.) to perform operations that involve the data. Processors 125 may then write a result of the operations back to memory 110. In order to facilitate the execution of instructions, processors 125 include map circuitry 130.

Map circuitry 130 (alternatively referred to as "register rename circuitry"), in various embodiments, is circuitry configured to map logical registers (also referred to as "architectural registers") specified by instructions to physical registers of its processor 125. When a processor 125 fetches an instruction, map circuitry 130 may store, in a map structure (e.g., a rename map table), a set of mappings between one or more of the logical registers identified by the operands of the fetched instruction and one or more of the physical registers included the map circuitry's processor 125. In order to facilitate the generation of those mappings, in various embodiments, map circuitry 130 includes a "free" list structure that identifies the currently available physical registers that can be used for a mapping. Accordingly, when generating a mapping between a logical register and a physical register, map circuitry 130 may select that physical register from the free list structure. When an instruction is being committed and retired, the physical registers associated with that instruction may be added back to the free list structure.

In various embodiments, map circuitry 130 includes circuitry configured to implement a rollback process to revert the map structure to a desired previous state, which can be referred to as the "restore point." For example, the rollback process may be implemented in the case of a branch misprediction or an exception. In order to facilitate the reversion of the map structure to a restore point, in various embodiments, map circuitry 130 includes a history file and stores map checkpoints 140. The history file may store information identifying the changes that were made to the map structure (e.g., the generation of a mapping). Map checkpoints 140, in various embodiments, include information (e.g., a set of mappings) that is usable by map circuitry 130 to restore the map structure to a particular state. In various instances, map circuitry 130 uses a combination of the history file and a particular map checkpoint 140 to revert the map structure to a restore point. An example of the rollback process is described in greater detail with respect to FIG. 5.

Map circuitry 130, however, can store only a limited number of map checkpoints 140 and thus implements replacement scheme 150 to replace stored map checkpoints 140 with new map checkpoints 140. In various embodiments, replacement scheme 150 is a non-FIFO scheme that uses tier values and other criteria (e.g., age) to replace map checkpoints 140. Replacement scheme 150 is described in greater detail with respect to FIGS. 3A and 3B. The implementation of replacement scheme 150 can result in a more equidistant distribution of the map checkpoints 140 in a changing execution window. An example of a distribution of map checkpoints 140 in a changing execution window under replacement scheme 150 is described in greater detail with respect to FIG. 4. In many cases, a more equidistant distribution of the map checkpoints 140 in a changing execution window allows map circuitry 130 to revert its map structure to a previous state in less operations than under a distribution resulting for a FIFO replacement scheme.

Memory controller 160, in various embodiments, includes circuitry that is configured to receive, from the other components of SOC 100, memory requests (e.g., load/store requests) to perform memory operations, such as accessing data from memory 110. Memory controller 160 may be configured to access any type of memory 110, such as those discussed earlier. In various embodiments, memory controller 160 includes queues for storing memory operations, for ordering and potentially reordering the operations and presenting the operations to memory 110. Memory controller 160 can further include data buffers to store write data awaiting write to memory 110 and read data awaiting return to the source of a memory operation. In various embodiments, memory controller 160 includes a memory cache that is used to store recently accessed memory data. In SOC implementations, for example, the memory cache may reduce the power consumption in SOC 100 by avoiding re-access of data from memory 110 if it is expected to be accessed again soon. In some cases, the memory cache might also be referred to as a system cache, as opposed to private caches (e.g., L1 caches) in processors 125 that serve only certain components. But, in some embodiments, a system cache need not be located within memory controller 160.

Peripherals 170, in various embodiments, are sets of additional hardware functionality included in SOC 100. For example, peripherals 170 may include video peripherals such as an image signal processor configured to process image capture data from a camera or other image sensor, GPUs, video encoder/decoders, scalers, rotators, blenders, display controllers, etc. As other examples, peripherals 170 may include audio peripherals such as microphones, speakers, interfaces to microphones and speakers, audio processors, digital signal processors, mixers, etc. Peripherals 170 may include interface controllers for various interfaces external to SOC 100, such as Universal Serial Bus (USB), peripheral component interconnect (PCI) including PCI Express (PCIe), serial and parallel ports, etc. The interconnection to external devices is illustrated by the dashed arrow in FIG. 1 that extends external to SOC 100. Peripherals 170 may include networking peripherals such as media access controllers (MACs).

Communication fabric 180 may be any communication interconnect and protocol for communicating among the components of SOC 100. For example, communication fabric 180 may enable processors 125 to issue and receive requests from peripherals 170 to access, store, and manipulate data. In some embodiments, communication fabric 180 is bus-based, including shared bus configurations, cross bar configurations, and hierarchical buses with bridges. In some embodiments, communication fabric 180 is packet-based, and may be hierarchical with bridges, cross bar, point-to-point, or other interconnects.

Figure 2:
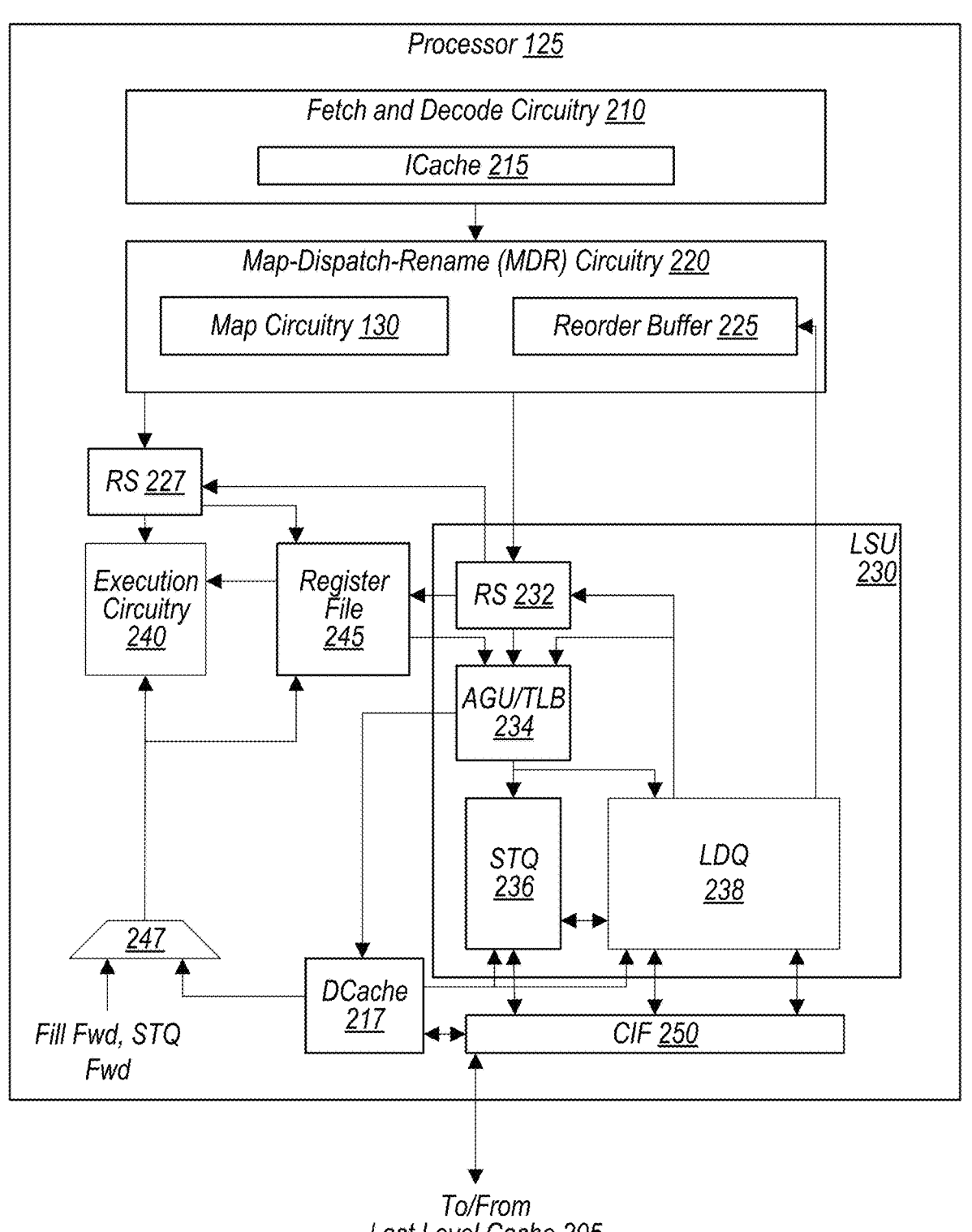
FIG. 2 is a block diagram illustrating example elements of a processor that include map-dispatch-rename circuitry having map circuitry, according to some embodiments.

Turning now to FIG. 2, a block diagram of a processor 125 is shown. In the illustrated embodiment, processor 125 includes fetch and decode circuitry 210, a map-dispatch-rename (MDR) circuitry 220, a set of reservation stations (RSs) 227 and 232, execution circuitry 240, a register file 245, a data cache, or "DCache", 217, a load/store circuitry (LSU) 230, and a core interface unit (CIF) 250. Also as shown, fetch and decode circuitry 210 includes an instruction cache, or "ICache", 215 and is coupled to MDR circuitry 220, which includes a reorder buffer 225 and map circuitry 130 and is coupled to RS 227 and LSU 230. More particularly, MDR circuitry 220 is coupled to an RS 232 in LSU 230. RS 227 is coupled to execution circuitry 240, and reorder buffer 225 is coupled to a load queue (LDQ) 238 in LSU 230. Also as shown, register file 245 is coupled to execution circuitry 240 and LSU 230 (more particularly, RS 232 and an address generation unit/translation lookaside buffer (AGU/TLB) 234). AGU/TLB 234 is coupled to DCache 217, which is coupled to CIF 250 and a multiplexor 247 that is coupled to execution circuitry 240 and register file 245. Another input of multiplexor 247 is coupled to receive other data (e.g., fill forward data from CIF 250 and/or forward data from a store queue 236 (STQ 236) in LSU 230. DCache 217 is coupled to STQ 236 and LDQ 238 in LSU 230. AGU/TLB 234 is coupled to RS 232, STQ 236, and LDQ 238. STQ 236 is coupled to LDQ 238, both of which are coupled to CIF 250.

Fetch and decode circuitry 210, in various embodiments, is circuitry that is configured to fetch instructions and decode them into instructions operations ("ops") for execution. More particularly, fetch and decode circuitry 210 may be configured to cache instructions fetched from a memory (e.g., memory 110) through CIF 250 in ICache 215. Fetch and decode circuitry 210 may fetch a speculative path of instructions and may implement prediction structures for predicting that speculative path, such as one that predicts fetch addresses based on previously executed instructions. In various embodiments, fetch and decode circuitry 210 decodes a given instruction into multiple ops, depending on the complexity of the given instruction. Particularly complex instructions may be microcoded. In such embodiments, the microcode routine for an instruction may be coded in ops. But in other embodiments, each instruction in the instruction set architecture implemented by processor 125 can be decoded into a single op and thus the op can be synonymous with instruction (although it may be modified in form by the decoder).

ICache 215 and DCache 217, in various embodiments, may each be a cache having any desired capacity, cache line size, and configuration. A cache line may be allocated/deallocated in a cache as a unit and thus may define the unit of allocation/deallocation for the cache. Cache lines may vary in size (e.g., 32 bytes, 64 bytes, or larger or smaller). Different caches may have different cache line sizes. There may further be more additional levels of cache between ICache 215/DCache 217 and the main memory, such as a last level cache. In various embodiments, ICache 215 is used to cache fetched instructions and DCache 217 is used to cache data fetched or generated by processor 125.

MDR circuitry 220, in various embodiments, is circuitry that is configured to map ops received from fetch and decode circuitry 210 to speculative resources to permit out-of-order and/or speculative execution. In particular, those ops may be mapped by map circuitry 130 to physical registers in register file 245 from the architectural registers that are used in the corresponding instructions. Accordingly, map circuitry 130 may store a set of mappings between architectural registers and physical registers. Register file 245 may implement a set of physical registers that is greater in number than the architectural registers used in the instruction set architecture that is implemented by processor 125. In various embodiments, there are separate physical registers for different operand types (e.g., integer, floating point, etc.). The physical registers, however, may be shared between different operand types. MDR circuitry 220, in various embodiments, includes circuitry that is configured to dispatch ops to reservation stations. As depicted, MDR circuitry 220 can dispatch ops to RS 227 and RS 232 in LSU 230. MDR circuitry 220 can also include circuitry that is configured to track the speculative execution and retires ops (or flushes misspeculated ops). In various embodiments, reorder buffer 225 is used in tracking the program order of ops and managing retirement/flush.

LSU 230, in various embodiments, is configured to execute memory ops received from MDR circuitry 220. Generally, a memory op is an instruction op that specifies an access to memory (e.g., memory 110), although that memory access may be completed in a cache such as DCache 217. Accordingly, a load memory op may specify a transfer of data from a memory location to a register of processor 125, while a store memory op may specify a transfer of data from a register to a memory location. Load memory ops can be referred to as load ops or loads, and store memory ops can be referred to as store ops or stores. In various cases, the instruction set architecture implemented by processor 125 permits memory accesses to different addresses to occur out of order but may require memory accesses to the same address (or overlapping addresses, where at least one byte is accessed by both overlapping memory accesses) to occur in program order.

LSU 230 may implement multiple load pipelines ("pipes"). Each pipeline may execute a different load, independent and in parallel with other loads in other pipelines. Consequently, RS 232 may issue any number of loads up to the number of load pipes in the same clock cycle. Similarly, LSU 230 may further implement one or more store pipes. In various embodiments, the number of store pipes is not equal to the number of load pipes—e.g., two store pipes and three load pipes may be used. RS 232 may also issue any number of stores up to the number of store pipes in the same clock cycle.

Load/store ops, in various embodiments, are received at RS 232, which is configured to monitor the source operands of the load/store ops to determine when they are available and then issue the ops to the load or store pipelines, respectively. AGU/TLB 234 may be coupled to one or more initial stages of the pipelines mentioned earlier. Some source operands may be available when the operations are received at RS 232, which may be indicated in the data that is received by RS 232 from MDR circuitry 220. Other operands may become available via execution of operations by execution circuitry 240 or even via execution of earlier load ops. The operands may be gathered by RS 232, or may be read from a register file 245 upon issue from RS 232 as shown in FIG. 2. In some embodiments, RS 232 is configured to issue load/store ops out of order (from their original order in the code sequence being executed by processor 125) as the operands become available.

AGU/TLB 234, in various embodiments, is configured to generate the address accessed by a load/store op when the load/store op is sent from RS 232. AGU/TLB 234 may further be configured to translate that address from an effective or virtual address created from the address operands of the load/store op to a physical address that can actually be used to address memory. In some embodiments, AGU/TLB 234 is configured to generate an access to DCache 217.

STQ 236, in various embodiments, track stores from initial execution to retirement by LSU 230 and may be responsible for ensuring that the memory ordering rules are not violated. Load ops may update an LDQ 238 entry preassigned to the load ops, and store ops may update STQ 236, to enforce ordering among operations. The store pipes may be coupled to STQ 236, which is configured to hold store ops that have been executed but have not committed. In some embodiments, STQ 236 is configured to detect that a load op hits on a store op during execution of the load op, and is further configured to cause a replay of the load op based on the detection of a hit on the store op and a lack of store data associated with the store op in STQ 236.

LDQ 238, in various embodiments, track loads from initial execution to retirement by LSU 230. LDQ 238 may be responsible for ensuring the memory ordering rules are not violated (between out of order executed loads, as well as between loads and stores). In the event that a memory ordering violation is detected, LDQ 238 may signal a redirect for the corresponding load. The redirect may cause processor 125 to flush that load and subsequent ops in program order, and refetch the corresponding instructions. Speculative state for the load and subsequent ops is discarded and ops are refetched by fetch and decode circuitry 210 and reprocessed to be executed again.

Execution circuitry 240, in various embodiments, include any types of execution units. For example, execution circuitry 240 may include integer execution units configured to execute integer ops, floating point execution units configured to execute floating point ops, or vector execution units configured to execute vector ops. Execution circuitry 240 can include a branch execution unit. Generally, integer ops are ops that perform a defined operation (e.g. arithmetic, logical, shift/rotate, etc.) on integer operands and floating point ops are ops that have been defined to operate on floating point operands. Vector ops may be used to process media data (e.g. image data such as pixels, audio data, etc.). Each execution unit may comprise hardware configured to perform the operations defined for the ops that that execution unit is defined to handle. The execution units may generally be independent of each other in that each execution unit is configured to operate on an op that was issued to that execution unit without dependence on other the execution units. Different execution units may have different execution latencies (e.g., different pipe lengths). Any number and type of execution units may be included within execution circuitry 240, in various embodiments, including embodiments having one execution unit and embodiments having multiple execution units.

CIF 250, in various embodiments, is responsible for communicating with the rest of the system that includes processor 125, on behalf of processor 125. For example, CIF 250 may be configured to request data for ICache 215 misses and DCache 217 misses. When the data is returned, CIF 250 may then signal the cache fill to the corresponding cache. For DCache fills, CIF 250 may inform LSU 230 (and more particularly LDQ 238). In some cases, LDQ 238 may schedule replayed loads that are waiting on the cache fill so that the replayed loads forward the fill data as it is provided to DCache 217 (referred to as a fill forward operation). If the replayed load is not successfully replayed during the fill, then that replayed load may be subsequently scheduled and replayed through DCache 217 as a cache hit. CIF 250 may writeback modified cache lines that have been evicted by DCache 217, merge store data for non-cacheable stores, etc. As shown, CIF 250 can interact with a last level cache 205.

Figure 3A:
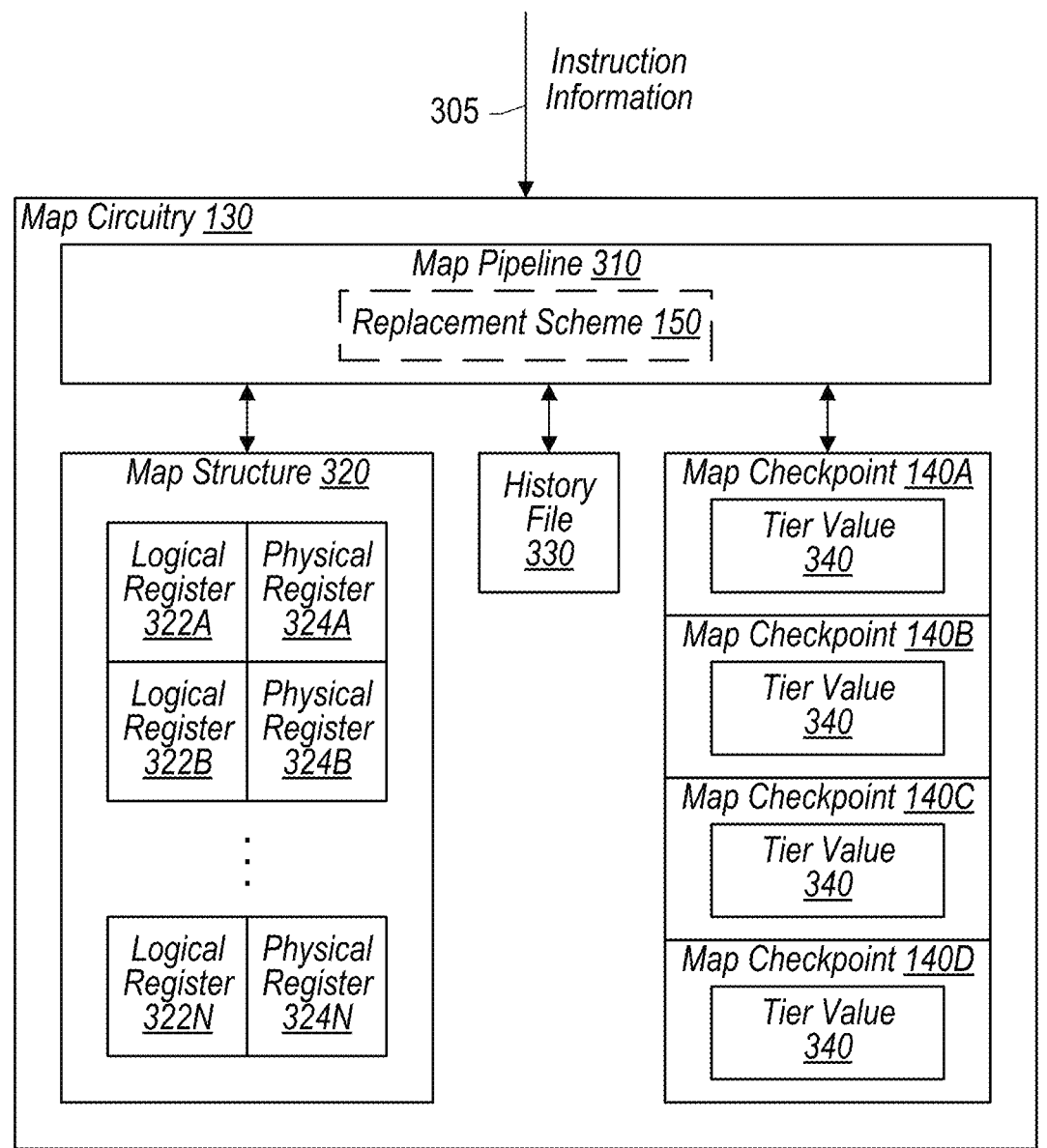
FIG. 3A is a block diagram illustrating example elements of the map circuitry that are configured to map logical registers to physical registers and store map checkpoints, according to some embodiments.

Turning now to FIG. 3A, a block diagram of example elements of map circuitry 130 is shown. In the illustrated embodiment, map circuitry 130 includes map checkpoints 140A-D, a map pipeline 310, a map structure 320, and a history file 330. Also as shown, map checkpoints 140 are each assigned a tier value 340, map pipeline 310 implements replacement scheme 150, and map structure 320 stores a set of mappings between logical registers 322A-N and physical registers 324A-N, respectively. The illustrated embodiment might be implemented differently than shown. For example, map circuitry 130 may store more or less map checkpoints 140 than shown. While map structure 320, history file 330, and map checkpoints 140A-D are depicted separately from map pipeline 310, in various embodiments, those elements are integrated into the circuitry of map pipeline 310, potentially different stages of map pipeline 310.

Map pipeline 310, in various embodiments, is circuitry configured to manage mappings between logical registers 322 and physical registers 324, including generating them and storing rollback information (e.g., map checkpoints 140) to allow for certain mappings to be restored at map structure 320. As part of processing an instruction, map pipeline 310 can receive, from fetch and decode circuitry 210, instruction information 305 that describes the instruction, such as one or more of the operands of that instruction. The one or more operands may specify one or more logical registers 322 to use in processing the instruction. While not shown, in various embodiments, map circuitry 130 includes a free list identifying physical registers 324 that are available for use in a mapping. Physical registers 324, in various embodiments, correspond to registers included in register file 245. After receiving instruction information 305, map pipeline 310 may select one or more physical registers 324 from the free list and then generate a set of mappings between the one or more logical registers 322 of the instruction and the one or more selected physical registers 324. Those mappings are stored in map structure 320, which may be a rename table structure. If there are not enough physical registers 324 available, then map pipeline 310 may wait until other instructions retire and their associated physical registers 324 are freed and made available for use.

Whenever a change is made to map structure 320 (e.g., a mapping is added), in various embodiments, map pipeline 310 records the change in history file 330. As a result, history file 330 can store a history of changes that occurred over a particular execution path or time period. If map pipeline 310 has been instructed to roll back to a particular point in execution, then map pipeline 310 may use history file 330 by undoing the recorded changes. As an example, history file 330 may record changes that occurred from the start of the execution of a speculative path, and in response to being instructed to restore map structure 320 to before the execution of the speculative path, map pipeline 310 may roll back map structure 320 to the desired restore point. As discussed, map circuitry 130 may further utilize map checkpoints 140 to reduce the number of cycles involved in rolling back map structure 320.

Map checkpoints 140 may be generated in response to various events or certain criteria being satisfied. In various embodiments, a map checkpoint 140 is generated after a particular number of mappings have been generated since the last map checkpoint 140, or a combination of 1) a particular number of indirect or conditional branch instructions occurring since the last map checkpoint 140 and 2) a particular number of mappings have been generated. For example, a map pipeline 310 may generate a map checkpoint 140 after 128 mappings or after 2 indirect branches and 32 mappings. The generated map checkpoint 140 can include the set of mappings stored in map structure 320 (at the point of generation) along with additional information, such as the current barrier count and the information from a physical commit table (PCT). In various embodiments, map pipeline 310 assigns, to the generated map checkpoint 140, a tier value 340 in accordance with a tier sequence used by replacement scheme 150. A tier value 340 may be an integer value (e.g., 0, 1, 2, 3, etc.) that affects when map pipeline 310 replaces the generated map checkpoint 140 (after it has been stored) with a newer map checkpoint 140. Map pipeline 310 may begin replacing map checkpoints 140 after it has stored the maximum number of map checkpoints 140 that it can store (e.g., four map checkpoints 140).

Figure 3B:
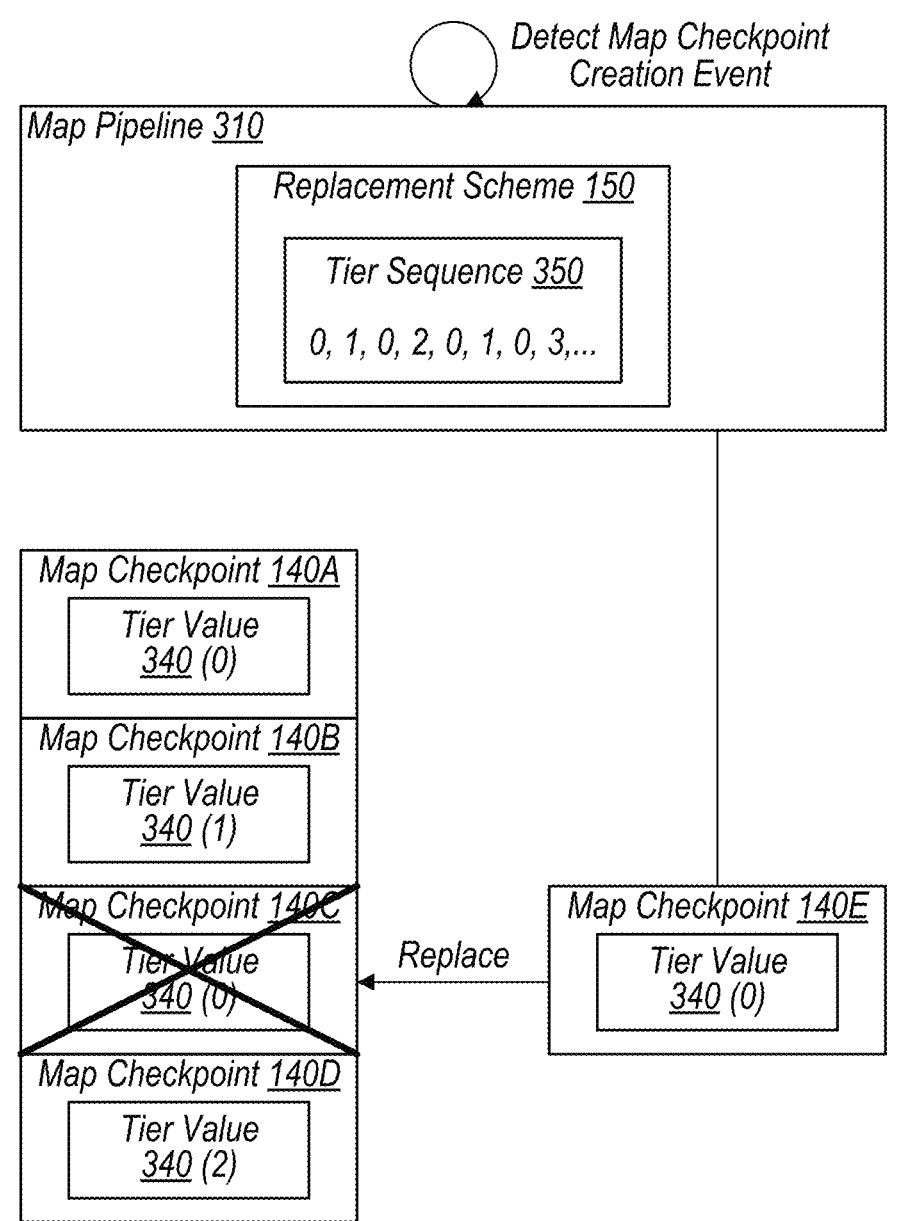
FIG. 3B is a block diagram illustrating a replacement scheme used by the map circuitry to replace map checkpoints, according to some embodiments.

Turning now to FIG. 3B, a block diagram of a replacement of a map checkpoint 140 in accordance with replacement scheme 150 is depicted. In the illustrated embodiment, there is a set of map checkpoints 140A-E and map pipeline 310 implementing replacement scheme 150 having tier sequence 350. As further shown, map checkpoints 140A, C, and E have a tier value 340 of "0," map checkpoint 140B has a tier value 340 of "1," and map checkpoint 150D has a tier value 340 of "2."

As explained, when a map checkpoint 140 is generated, map pipeline 310 can assign it a tier value 340 based on a tier sequence (e.g., tier sequence 350). Tier sequence 350, in various embodiments, is a repeating sequence of integer values derived from a particular formula that involves taking the number sequence from 1 to $2^n$ and, for each number, computing the largest k for which $2^k$ would evenly divide the number. For example, if n=4, then the resulting number sequence is 1, 2, 3, 4, 5, 6, 7, 8, 9, 10, 11, 12, 13, 14, 15, and 16, and the resulting tier sequence 350 from that number sequence is 0, 1, 0, 2, 0, 1, 0, 3, 0, 1, 0, 2, 0, 1, 0, and 4. In various cases, n is selected such that map checkpoints 140 assigned the highest tier value 340 are guaranteed to cover the whole out-of-order window—meaning that a highest tier map checkpoint 140 is not replaced due to map checkpoint allocation, but only due to being invalidated on retirement. Map pipeline 310, in various embodiments, traverses through tier sequence 350, assigning one map checkpoint 140 per integer value in the sequence. As shown for example, map checkpoint 140A is assigned the first value (i.e., 0) of tier sequence 350, map checkpoint 140B is assigned the second value (i.e., 1), map checkpoint 140C is assigned the third value (i.e., 0), map checkpoint 140D is assigned the fourth value (i.e., 2), and map checkpoint 140E is assigned the fifth value (i.e., 0). Upon reaching the end of tier sequence 350, map pipeline 310 may then start again from the beginning of tier sequence 350. When rolling back to a restore point, in various embodiments, map pipeline 310 restarts from the value of tier sequence 350 occurring after the particular tier value 340 assigned to the map checkpoint 140 used in the restore process. For example, if map checkpoint 140B is used to restore map structure 320 to the restore point, then the next generated map checkpoint 140 is assigned the third value (i.e., 0) in tier sequence 350 as map checkpoint 140B was assigned the second value in tier sequence 350.

When replacing a stored map checkpoint 140 with a newly generated map checkpoint 140, map pipeline 310 may consider various criteria when selecting the map checkpoint 140 being replaced. In particular, in various embodiments, replacement scheme 150 prioritizes the replacement of 1) invalid over valid, 2) lower over higher tier values 340, and 3) age (youngest first) and in that order. In regard to the first criterion, map checkpoints 140 may be invalidated in response to the occurrence of certain events. For example, a retire pointer may advance past an execution point that corresponds to a map checkpoint 140 and thus that map checkpoint 140 may be invalidated. Consequently, if there is an invalid, stored map checkpoint 140, then map pipeline 310 replaces that map checkpoint 140 with the newly generated map checkpoint 140. If there is no invalid map checkpoint 140, then map pipeline 310 considers the tier values 340 of the stored map checkpoints 140. Lower tier values 340 may be considered lower priorities than higher tier values 340. As a result, map pipeline 310 may replace a lower-tier-valued map checkpoint 140 before a higher-tier-valued map checkpoint 140. In some cases, however, there might be multiple stored map checkpoints 140 assigned the same tier value 340. As shown for example, map checkpoint 140A and 140C are assigned the same tier value 340 of "0." As such, in various embodiments, map pipeline 310 selects the most recently stored (the youngest) map checkpoint 140. In the illustrated embodiment, map checkpoint 140A was stored before map checkpoint 140C and thus map checkpoint 140C is selected for replacement. Accordingly, map pipeline 310 replaces map checkpoint 140C with map checkpoint 140E.

Figure 4:
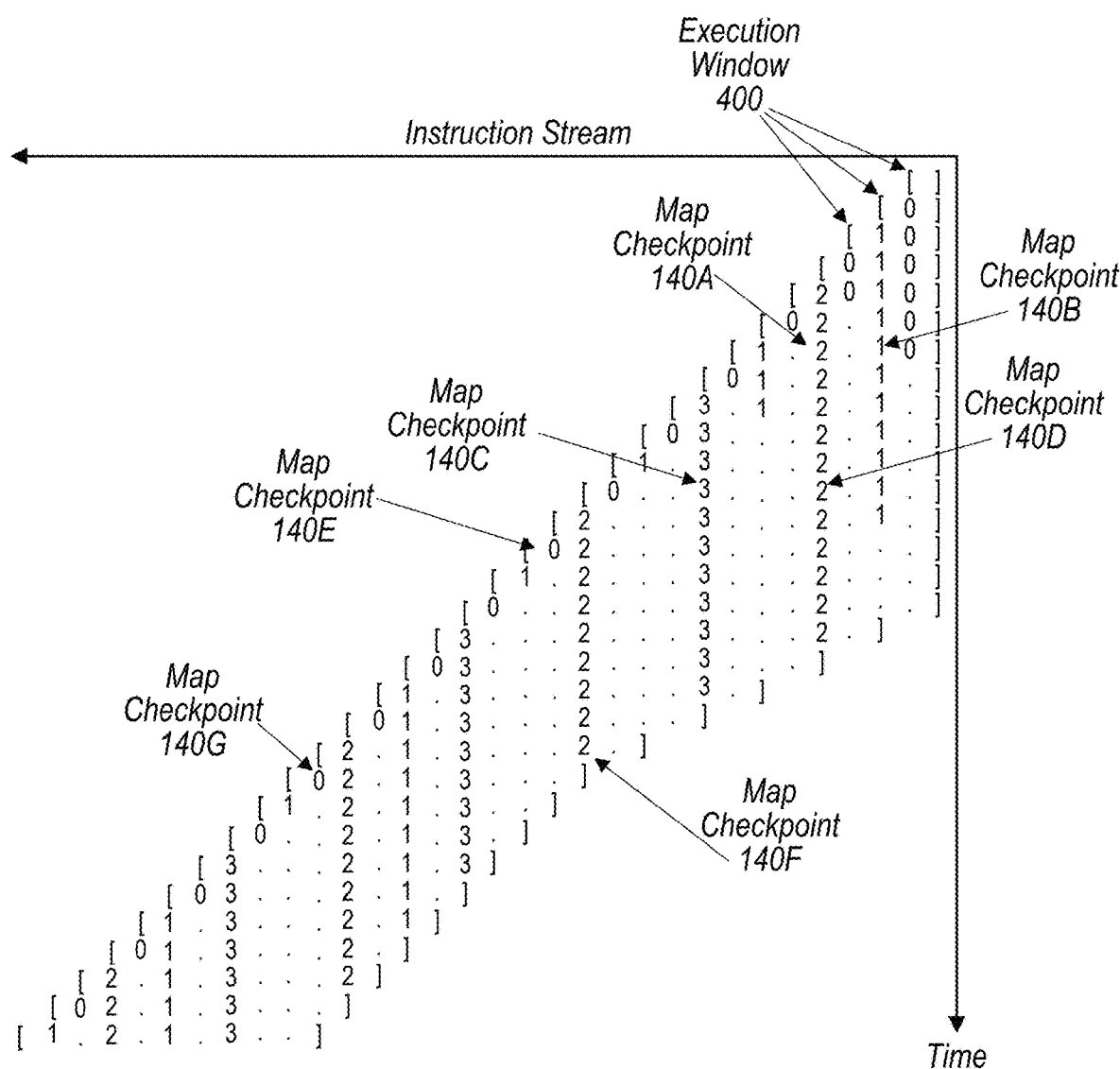
FIG. 4 is a block diagram illustrating an example of the placement of map checkpoints in a dynamically changing instruction window over time when using the replacement scheme, according to some embodiments.

Turning now to FIG. 4, a block diagram of an example placement of map checkpoints 140 in a dynamically changing execution window 400 when using replacement scheme 150 is shown. In the illustrated embodiment, execution window 400 is presented in relation to an instruction stream axis and a time axis. Execution window 400, in various embodiments, is an out-of-order execution window 400 that dynamically changes (expands and contracts) over time as instructions are renamed/mapped (causing expansion) and retire (causing contraction) over time. As instructions are renamed over time, new registers mappings are generated and stored in map structure 320, and map pipeline 310 creates and stores map checkpoints 140. In the illustrated embodiment, the tier values 340 of map checkpoints 140 are shown in execution window 400, such as the tier value 340 of "2" for map checkpoint 140A. Map checkpoints 140 are replaced, in FIG. 4, in accordance with the criteria discussed in detail with respect to FIG. 3B. As shown for example, map checkpoint 140B is replaced by map checkpoint 140E since map checkpoint 140B has the lowest tier value 340 of the stored map checkpoints 140 and there are no stored map checkpoints 140 that have the same tier value 340 as map checkpoint 140B or are invalid when map checkpoint 140E is allocated.

As illustrated, execution window 400 expands and contracts across time as instructions are renamed and then retire over time. In various embodiments, the values and their ordering in tier sequence 350 is such that the instruction distance between stored map checkpoints 140 increases over time as the number of instructions within execution window 400 increases over that time. As shown for example, the instruction distance between map checkpoints 140A and 140B is less than the instruction distance between map checkpoints 140C and 140D, which are associated with a more expanded execution window 400. Similarly, the instruction distance between stored map checkpoints 140 decreases over time as the number of instructions within execution window 400 decreases. Furthermore, the number of different tire values (e.g., 1, 2, 3, and 4) used in tier sequence 350 can be selected so that the stored map checkpoints 140 are uniformly (or relatively uniformly) distributed within execution window 400 when execution window 400 includes a defined maximum number of instructions, such as 320 instructions.

When a map checkpoint 140 "passes" outside of execution window 400, map pipeline 310 invalidates that map checkpoint 140, in various embodiments. In particular, map pipeline 310 may obtain an indication that a retire pointer (defining an edge of execution window 400) has advanced past a particular point in execution window 400 that corresponds to a certain store map checkpoint 140. Accordingly, map pipeline 310 may invalidate that map checkpoint 140 in response to the indication. As shown, map checkpoint 140F passes outside of execution window 400 and thus is invalidated by map pipeline 310 In some embodiments, map pipeline 310 may invalidate map checkpoints 140 based on the advancement of a branch resolve pointer instead of the retire pointer. In various cases, map pipeline 310 replaces an invalidated, high-tier-valued map checkpoint 140 with a newly generated map checkpoint 140 assigned a lower tier value 340. For example, map checkpoint 140G having a tier value 340 of "0" replaces map checkpoint 140F having a tier value 340 of "2".

Figure 5:
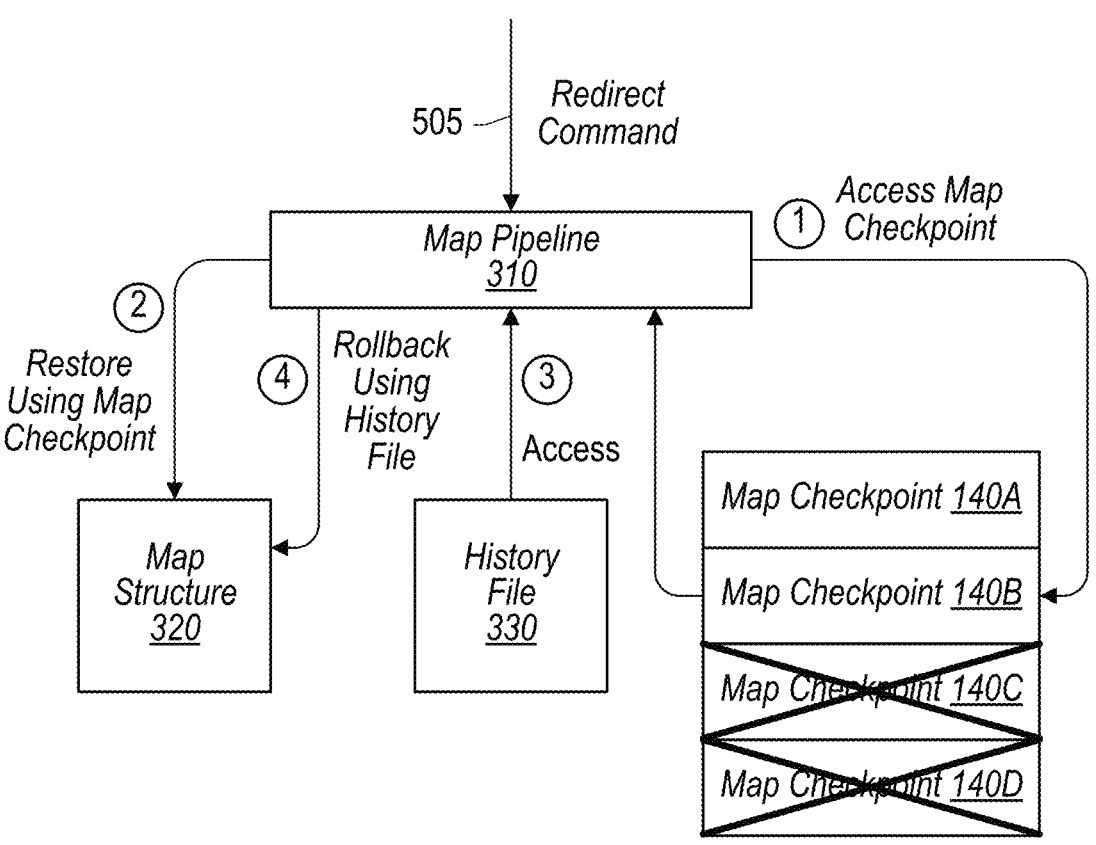
FIG. 5 is a block diagram illustrating a rollback process to roll back a map structure to a prior state, according to some embodiments.

Turning now to FIG. 5, a block diagram of a rollback process to roll back map structure 320 to a prior state is shown. In the illustrated embodiment, there are map checkpoints 140A-D, map pipeline 310, map structure 320, and history file 330. The illustrated embodiment may be implemented differently than shown. For example, history file 330 might not be used in the rollback process.

During its operation, a processor 125 can encounter certain scenarios in which it has to roll back to a prior state. As an example, a processor 125 may speculate which instruction path of a program will be taken based on the execution of a conditional branch instruction and begin executing instructions along the speculated path. In various embodiments, if the speculation is incorrect, then that processor 125 discards the results of the speculatively executed instructions and starts over from the correct path. In order to start over from the correct path, that processor 125 rolls back components, including map structure 320, to a prior state that existed before the speculative path was taken.

Accordingly, as depicted, map pipeline 310 can receive a redirect command 505 to roll back map structure 320 to a prior state. Redirect command 505 can be received in response to, e.g., an incorrect speculation (e.g., a branch misprediction), an exception, an interruption, or a transaction memory issue and may indicate a restore point (e.g., an instruction) in the execution path to which to roll back. Based on redirect command 505, map pipeline 310 may select one of the stored map checkpoints 140 to use in the rollback process. In various embodiments, map pipeline 310 selects the map checkpoint 140 that occurs closest to the restore point and is after the restore point and restores map structure 320 based on the selected map checkpoint 140. In the illustrated embodiment, map pipeline 310 selects map checkpoint 140B and then uses it to restore map structure 320. To restore map structure 320, in various embodiments, map pipeline 310 stores, in map structure 320, the logical register to physical register mappings recorded in the selected map checkpoint 140. The previous mappings may be discarded or overridden. Map checkpoints 140 that were generated after the selected map checkpoint 140 may be discarded e.g., map checkpoints 140C-D are discarded in the illustrated embodiment.

In many cases, the selected map checkpoint 114 corresponds to a different point in the execution path than the restore point. Accordingly, in various embodiments, map pipeline 310 uses history file 330 to further roll back map structure 320 from the point in the execution path corresponding to the selected map checkpoint 114 to the restore point. Thus, map pipeline 310 may undo the changes made to map structure 320 that are recorded in history file 330 such that map structure 320 is rolled back to the restore point. As part of rolling back map structure 320 to the restore point, map pipeline 310 may discard those changes from history file 330. In some embodiments, map pipeline 310 selects the map checkpoint 140 closest to the restore point but is before the restore point and restores map structure 320 based on that selected map checkpoint 140. In such embodiments, instead of rolling back from the point corresponding to the selected map checkpoint 140 to the restore point, map pipeline 310 rolls forward from that point to the restore point. Consequently, map pipeline 310 may replay, using history file 330, the changes that were made to map structure 320 between those two points.

Turning now to FIG. 6, a flow diagram of a method 600 is shown. Method 600 is one embodiment of a method performed by map circuitry (e.g., map circuitry 130) of a processor (e.g., a processor 125) that involves replacing map checkpoints (e.g., map checkpoints 140) in accordance with a non-first in, first out replacement scheme (e.g., replacement scheme 150). Method 600 may be performed as a part of the processor retrieving and executing instructions and may include more or less steps than shown. For example, method 600 may include a step in which the map circuitry invalidates a map checkpoint in response to detecting that a retire pointer has advanced past a point (that corresponds to the map checkpoint) in a dynamically changing out-of-order execution window (e.g., execution window 400).

Method 600 begins in step 610 with the map circuitry maintaining a map structure (e.g., map structure 320) that maps a set of logical registers (e.g., logical registers 322) specified by an instruction to a set of the plurality of physical registers (e.g., physical registers 324) of the processor. In step 620, the map circuitry stores a set of map checkpoints. A given one of those map checkpoints, in various embodiments, corresponds to the state of the map structure at a respective particular point in the dynamically changing out-of-order execution window and is usable by the processor to roll back the map structure to the state at the particular point.

In step 630, based at least in part on a detection that the set of map checkpoints includes a threshold number of map checkpoints (e.g., a buffer storing the map checkpoints is full), the map circuitry replaces a first one of the set of map checkpoints with a second map checkpoint in accordance with a non-FIFO replacement scheme that alters relative spacing of the set of map checkpoints within the dynamically changing out-of-order execution window. In various embodiments, the map circuitry generates the second map checkpoint in response to detecting that a threshold number of map operations (e.g., 50 map operations) have been executed and a threshold number of conditional branch instructions (e.g., two instructions) have been issued in the processor since the last map checkpoint was generated. In various embodiments, the map circuitry assigns, the second map checkpoint, the next tier value of a tier sequence comprising a repeating series of tier values.

The map circuitry may select the first map checkpoint over another one of the set of map checkpoints based on the first map checkpoint being assigned a lower prioritized tier value than the other map checkpoint. The map circuitry may also select the first map checkpoint over another map checkpoint that is assigned the same tier value as the first map checkpoint based on the first map checkpoint being stored more recently than the other map checkpoint. The map circuitry may select the first map checkpoint over another map checkpoint that is assigned the same tier value as the first map checkpoint based on the first map checkpoint being stored less recently than the other map checkpoint—the first map checkpoint may be selected over other map checkpoints having the same tier value if it is the oldest map checkpoint having that tier value. The map circuitry may select the first map checkpoint over another map checkpoint that is assigned a lower prioritized tier value based on the first map checkpoint having been invalidated.

The map circuitry may receive an indication of a branch misprediction. Based on that branch misprediction, the map circuitry may select one of the set of map checkpoints to which to roll back the state of the map structure and invalidate any one of the set of map checkpoints that was stored more recently than the selected map checkpoint. In various embodiments, the map circuitry stores a history of changes (e.g., history file 330) made to the map structure. The map circuitry may determine to roll back the state of the map structure to a prior state based on the branch misprediction. Based on a detection that the prior state is different than a state identified by the selected map checkpoint, the map circuitry may perform a roll back operation to roll back the state of the map structure to the state identified by the selected map checkpoint. The map circuitry may roll back, based on the history of changes, the state of the map structure to the prior state from the state identified by the selected map checkpoint.

Turning now to FIG. 7, a flow diagram of a method 700 is shown. Method 700 is one embodiment of a method that is performed by a processor (e.g., a processor 125) that involves replacing map checkpoints (e.g., map checkpoints 140) based on a replacement scheme (e.g., replacement scheme 150) that permits out of order replacement. Method 700 may include more or less steps than shown. For example, method 700 may include a step in which the processor invalidates a map checkpoint in response to detecting that a retire pointer has advanced past a particular point in a dynamically changing out-of-order execution window.

Method 700 begins in step 710 with the processor receiving an instruction to execute. In step 720, the processor updates a state of a map structure (e.g., map structure 320) to map a set of logical registers (e.g., logical registers 322) that is specified by the instruction to a set of physical registers (e.g., physical registers 324) of the processor. In step 730, the processor then stores a first map checkpoint (e.g., map checkpoint 140E) that corresponds to the updated state of the map structure. The first map checkpoint may be usable by the processor to restore the map structure to the updated state. In various embodiments, the processor assigns, to the first map checkpoint, a first tier value from a tier sequence (e.g., tier sequence 350) of a repeating series of tier values. The repeating series of tier values may be ordered such that an instruction distance between the stored map checkpoints increases over time as a number of instructions within the dynamically changing instruction window increases over the time.

In step 732, as a part of the storing, the processor selects a second map checkpoint (e.g., map checkpoint 140C) from a set of stored map checkpoints based on the replacement scheme. The second map checkpoint may be selected out of order relative to an order in which the set of stored map checkpoints were stored. In some cases, the second map checkpoint is selected based on the second map checkpoint being assigned a second-tier value that has a lower priority than tier values assigned to other ones of the set of stored map checkpoints. In some cases, at least one other map checkpoint of the set of stored map checkpoints is assigned the second tier value, and the second map checkpoint is selected based on the second map checkpoint being the youngest map checkpoint assigned the second tier value. The second tier value might have a higher priority than the first tier value assigned to the first map checkpoint that overrides the second map checkpoint. The number of different tier values used in the repeating series of tier values may be selected such that the stored map checkpoints are uniformly distributed in the instruction window when the instruction window includes a defined maximum number of instructions. In step 734, as a part of the storing, the processor overrides the second map checkpoint with the first map checkpoint.

Turning now to FIG. 8, a flow diagram of a method 800 is shown. Method 800 is one embodiment of a method performed by map circuitry (e.g., map circuitry 130) of an integrated circuit that involves replacing map checkpoints (e.g., map checkpoints 140) in accordance with a replacement scheme (e.g., replacement scheme 150) that replaces map checkpoints at least partially out of order relative to an order in which the map checkpoints are stored. Method 800 may include more or less steps than shown.

Method 800 begins in step 810 with the map circuitry maintaining a map structure (e.g., map structure 320) that maps a set of logical registers (e.g., logical registers 322) specified by an instruction to a set of the plurality of physical registers (e.g., physical registers 324) of the hardware integrated circuit. In step 820, the map circuitry generates a first map checkpoint corresponding to a state of the map structure at a particular point in an execution path. The first map checkpoint enables the hardware integrated circuit to roll back the map structure to the state at the particular point. In some embodiments, the map circuitry obtains an indication that a threshold number of map operations have been executed since a last map checkpoint was generated and then generates the first map checkpoint in response to the indication. The map circuitry may assign, to the first map checkpoint, a first tier value from a repeating series of tier values (e.g., tier sequence 350). In various embodiments, to implement the replacement scheme, the map circuitry selects a map checkpoint for replacement based on validity state, tier value, and age.

In step 830, the map circuitry replaces a previously stored second map checkpoint with the first map checkpoint in accordance with the replacement. In some cases, the map circuitry invalidates a stored map checkpoint in response to receiving an indication that the stored map checkpoint has passed outside of a dynamically changing out-of-order execution window (e.g., execution window 400). The map circuitry may select one of a set of map checkpoints to which to restore the map structure and then invalidate any one of the set of map checkpoints that was stored more recently than the selected map checkpoint.

Figure 9:
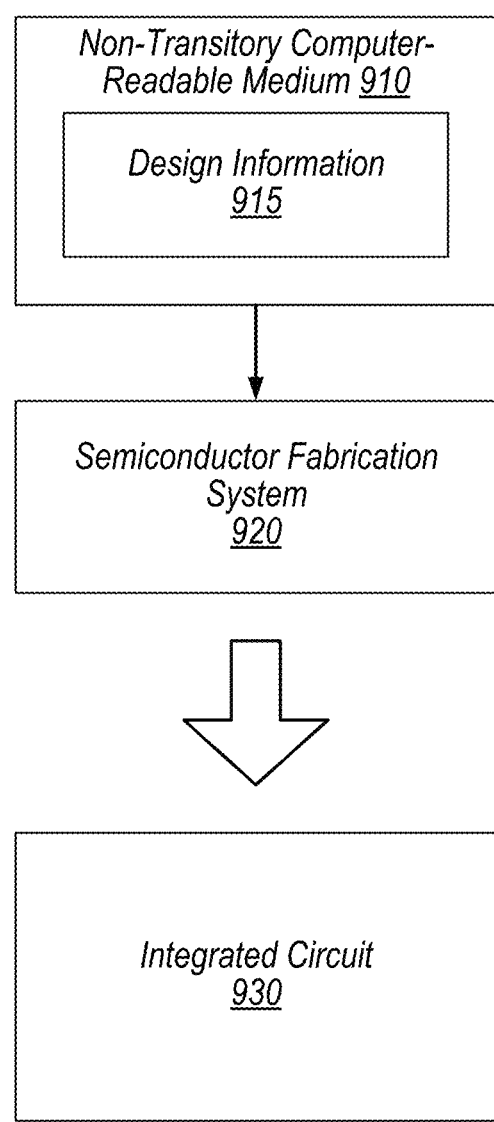
FIG. 9 is a block diagram illustrating an example process of fabricating at least a portion of an SOC, according to some embodiments.

Turning now to FIG. 9, a block diagram illustrating an example process of fabricating an integrated circuit 930 that can include at least a portion of SOC 100 is shown. The illustrated embodiment includes a non-transitory computer-readable medium 910 (which includes design information 915), a semiconductor fabrication system 920, and a resulting fabricated integrated circuit 930. In some embodiments, integrated circuit 930 includes at least a CPU complex 120, a memory controller 160, and one or more peripherals 170. Integrated circuit 930 may further additionally or alternatively includes other circuits such as a wireless network circuit. In the illustrated embodiment, semiconductor fabrication system 920 is configured to process design information 915 to fabricate integrated circuit 930.

Non-transitory computer-readable medium 910 may include any of various appropriate types of memory devices or storage devices. For example, non-transitory computer-readable medium 910 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 910 may include two or more memory mediums, which may reside in different locations (e.g., in different computer systems that are connected over a network).

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries, which specify the synthesis and/or layout of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit (e.g., integrated circuit 930). For example, design information 915 may specify circuit elements to be fabricated but not their physical layout. In this case, design information 915 may be combined with layout information to fabricate the specified integrated circuit.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements described with reference to FIGS. 1-5. Furthermore, integrated circuit 930 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 930 is performed. Design information 915 may be generated using one or more computer systems and stored in non-transitory computer-readable medium 910. The method may conclude when design information 915 is sent to semiconductor fabrication system 920 or prior to design information 915 being sent to semiconductor fabrication system 920. Accordingly, in some embodiments, the method may not include actions performed by semiconductor fabrication system 920. Design information 915 may be sent to semiconductor fabrication system 920 in a variety of ways. For example, design information 915 may be transmitted (e.g., via a transmission medium such as the Internet) from non-transitory computer-readable medium 910 to semiconductor fabrication system 920 (e.g., directly or indirectly). As another example, non-transitory computer-readable medium 910 may be sent to semiconductor fabrication system 920. In response to the method of initiating fabrication, semiconductor fabrication system 920 may fabricate integrated circuit 930 as discussed above.

Figure 10:
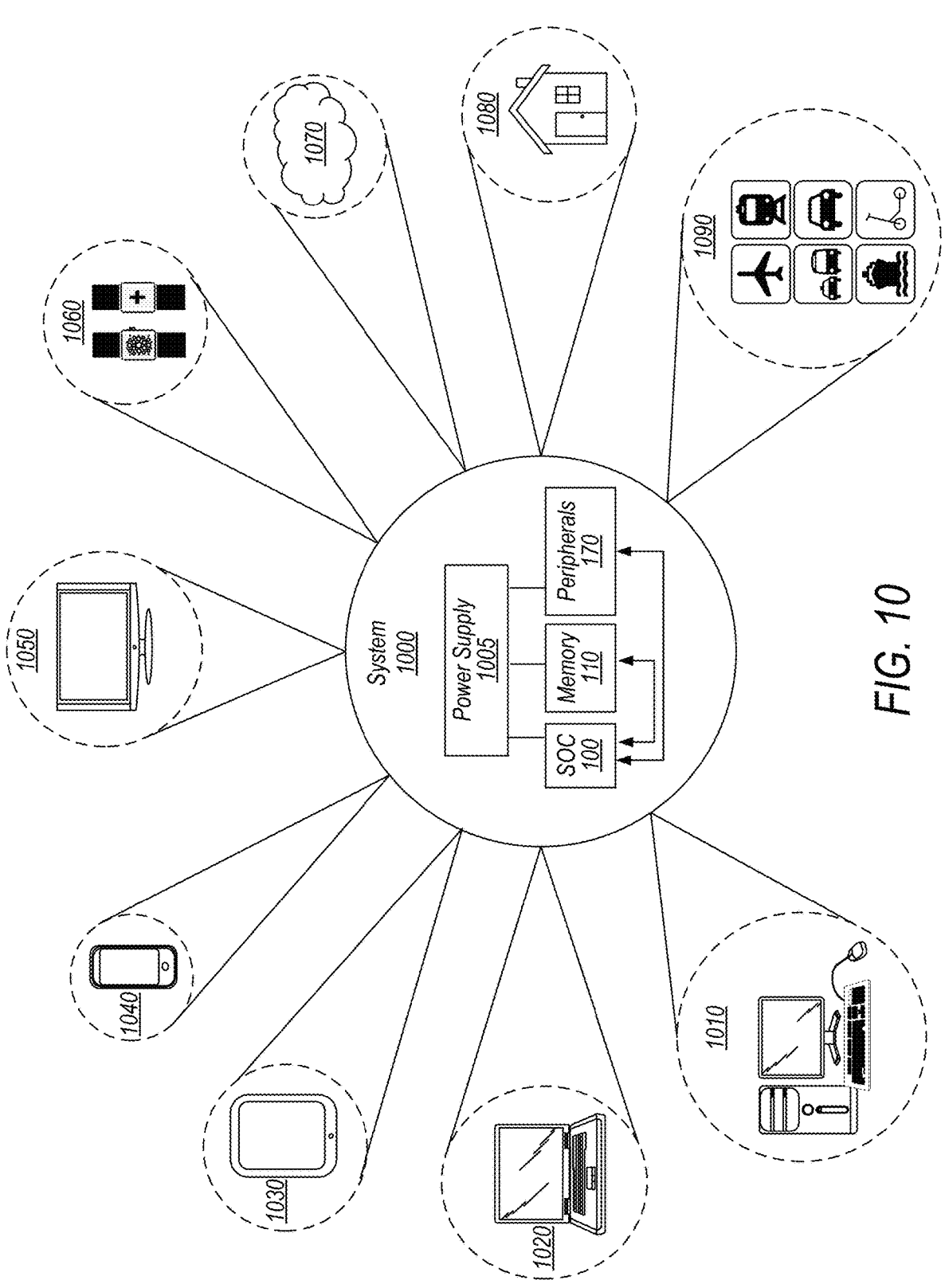
FIG. 10 is a block diagram illustrating an example SOC that is usable in various types of systems, according to some embodiments.

Turning next to FIG. 10, a block diagram of one embodiment of a system 1000 is shown that may incorporate and/or otherwise utilize the methods and mechanisms described herein. In the illustrated embodiment, the system 1000 includes at least one instance of a system on chip (SOC) 100 that is coupled to external memory 110, peripherals 170, and a power supply 1005. Power supply 1005 is also provided which supplies the supply voltages to SOC 100 as well as one or more supply voltages to the memory 110 and/or the peripherals 170. In various embodiments, power supply 1005 represents a battery (e.g., a rechargeable battery in a smart phone, laptop or tablet computer, or other device). In some embodiments, more than one instance of SOC 100 is included (and more than one external memory 110 is included as well).

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1000 may further be used as part of a cloud-based service(s) 1070. For example, the previously mentioned devices, and/or other devices, may access computing resources in the cloud (e.g., remotely located hardware and/or software resources). Still further, system 1000 may be utilized in one or more devices of a home 1080 other than those previously mentioned. For example, appliances within home 1080 may monitor and detect conditions that warrant attention. For example, various devices within home 1080 (e.g., a refrigerator, a cooling system, etc.) may monitor the status of the device and provide an alert to the homeowner (or, for example, a repair facility) should a particular event be detected. Alternatively, a thermostat may monitor the temperature in home 1080 and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise. These any many other embodiments are possible and are contemplated. It is noted that the devices and applications illustrated in FIG. 10 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a computer processor that includes:
   a plurality of physical registers, a given one of which is configured to store a value;
   fetch circuitry configured to fetch instructions; and
   map circuitry coupled to the fetch circuitry and configured to:
      maintain a map structure that maps a set of logical registers specified by an instruction to a set of the plurality of physical registers of the computer processor;
      store a set of map checkpoints, wherein a given one of the set of map checkpoints corresponds to a state of the map structure at a particular point in a dynamically changing out-of-order execution window and is usable by the computer processor to roll back the map structure to the state at the particular point;
      assign a tier value to a given map checkpoint of the set of map checkpoints based on a sequence of a repeating series of tier values; and
      based at least in part on a detection that the set of map checkpoints includes a threshold number of map checkpoints, select and replace a first one of the set of map checkpoints with a second map checkpoint in accordance with a non-first in, first out (non-FIFO) replacement scheme that alters relative spacing of the set of map checkpoints within the dynamically changing out-of-order execution window, wherein the first map checkpoint is selected based on a tier value assigned to the first map checkpoint.

2. The apparatus of claim 1, wherein the map circuitry is further configured to:
   select the first map checkpoint over a third one of the set of map checkpoints based on the first map checkpoint being assigned a lower prioritized tier value than the third map checkpoint.

3. The apparatus of claim 2, wherein the map circuitry is further configured to:
   select the first map checkpoint over a fourth map checkpoint that is assigned a same tier value as the first map checkpoint based on the first map checkpoint being stored more recently than the fourth map checkpoint.

4. The apparatus of claim 2, wherein the map circuitry is further configured to:
   select the first map checkpoint over a fourth map checkpoint that is assigned a lower prioritized tier value based on the first map checkpoint having been invalidated.

5. The apparatus of claim 2, wherein the map circuitry is further configured to:
   select the first map checkpoint over a fourth map checkpoint that is assigned a same tier value as the first map checkpoint based on the first map checkpoint being stored less recently than the fourth map checkpoint.

6. The apparatus of claim 1, wherein the map circuitry is configured to:
   receive an indication of a branch misprediction;
   based on the branch misprediction, select one of the set of map checkpoints to which to roll back the state of the map structure; and
   invalidate any one of the set of map checkpoints that was stored more recently than the selected map checkpoint.

7. The apparatus of claim 6, wherein the map circuitry is configured to:
   store a history of changes made to the map structure; and
   determine to roll back the state of the map structure to a prior state based on the branch misprediction; and
   based on a detection that the prior state is different than a state identified by the selected map checkpoint, perform a roll back operation to roll back the state of the map structure to the prior state, wherein the roll back operation includes:
      restoring the state of the map structure to the state identified by the selected map checkpoint; and
      rolling back, based on the history of changes, the state of the map structure to the prior state from the state identified by the selected map checkpoint.

8. The apparatus of claim 1, wherein the map circuitry is configured to:
   detect that a threshold number of map operations have been executed and a threshold number of conditional branch instructions have been issued in the computer processor since a last map checkpoint was generated; and
   generate the second map checkpoint in response to the detect.

9. The apparatus of claim 1, wherein the map circuitry is configured to:
   obtain an indication that a retire pointer has advanced past the particular point in the dynamically changing out-of-order execution window; and
   invalidate the second map checkpoint in response to the indication and a detection that the second map checkpoint is stored in a valid state.

10. A method, comprising:
   receiving, by a processor of a computer system, an instruction to execute;
   updating, by the processor, a state of a map structure of the processor to map a set of logical registers specified by the instruction to a set of physical registers of the processor;
   storing, by the processor, a first map checkpoint that corresponds to the updated state of the map structure, wherein the first map checkpoint is usable by the processor to restore the map structure to the updated state, and wherein the storing includes:
      selecting a second map checkpoint from a set of stored map checkpoints based on a replacement scheme, wherein the second map checkpoint is selected out of order relative to an order in which the set of previously stored map checkpoints were stored; and
      replacing the second map checkpoint with the first map checkpoint.

11. The method of claim 10, further comprising:
   assigning, by the processor and to the first map checkpoint, a first tier value from a tier sequence of a repeating series of tier values, wherein the second map checkpoint is selected based on the second map checkpoint being assigned a second tier value that has a lower priority than tier values assigned to other ones of the set of stored map checkpoints.

12. The method of claim 11, wherein at least one other map checkpoint of the set of stored map checkpoints is assigned the second tier value, and wherein the second map checkpoint is selected based on the second map checkpoint being the youngest map checkpoint assigned the second tier value.

13. The method of claim 11, wherein the second tier value of the second map checkpoint has a higher priority than the first tier value assigned to the first map checkpoint.

14. The method of claim 11, wherein the repeating series of tier values is ordered so that an instruction distance between the set of stored map checkpoints increases over time as a number of instructions within a dynamically changing instruction window increases over that time.

15. The method of claim 11, wherein a number of different tier values used in the repeating series of tier values is selected so that the set of stored map checkpoints is uniformly distributed in an instruction window when the instruction window includes a defined maximum number of instructions.

16. A non-transitory computer readable medium having stored thereon design information that specifies a circuit design in a format recognized by a fabrication system that is configured to use the design information to fabricate a hardware integrated circuit that comprises:

a plurality of physical registers, a given one of which is configured to store a value;

fetch circuitry configured to fetch instructions; and map circuitry coupled to the fetch circuitry and configured to:

maintain a map structure that maps a set of logical registers specified by an instruction to a set of the plurality of physical registers of the hardware integrated circuit;

generate a first map checkpoint corresponding to a state of the map structure at a particular point in an execution path, wherein the first map checkpoint enables the hardware integrated circuit to roll back the map structure to the state at the particular point; and replace a previously stored second map checkpoint with the first map checkpoint in accordance with a replacement scheme that replaces map checkpoints at least partially out of order relative to an order in which the map checkpoints are stored.

17. The non-transitory computer readable medium of claim 16, wherein the map circuitry is configured to:

assign, to the first map checkpoint, a first tier value from a repeating series of tier values, wherein to implement the replacement scheme, the map circuitry is configured to select a map checkpoint for replacement based on validity state, tier value, and age.

18. The non-transitory computer readable medium of claim 16, wherein the map circuitry is configured to:

obtain an indication that a threshold number of map operations have been executed since a last map checkpoint was generated; and generate the first map checkpoint in response to the indication.

19. The non-transitory computer readable medium of claim 16, wherein the map circuitry is configured to:

invalidate a stored map checkpoint in response to receiving an indication that the stored map checkpoint has passed outside of a dynamically changing out-of-order execution window.

20. The non-transitory computer readable medium of claim 16, wherein the map circuitry is configured to:

select one of a set of map checkpoints to which to restore the map structure; and invalidate any one of the set of map checkpoints that was stored more recently than the selected map checkpoint.

* * * * *